March 11, 1941.                 P. NIELSEN                 2,234,412
                   SWITCH MECHANISM FOR VEHICLE SIGNALS
                          Filed Oct. 23, 1939
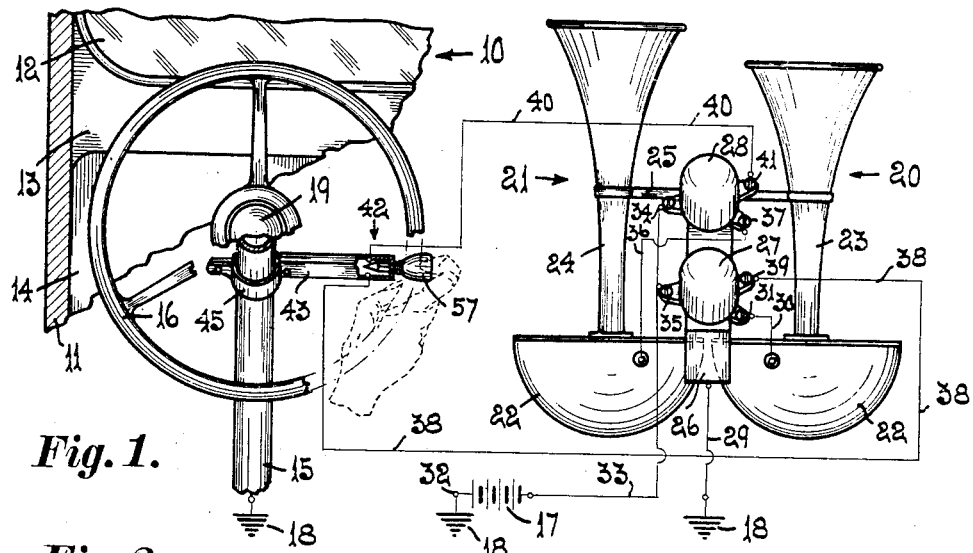
Fig. 1.
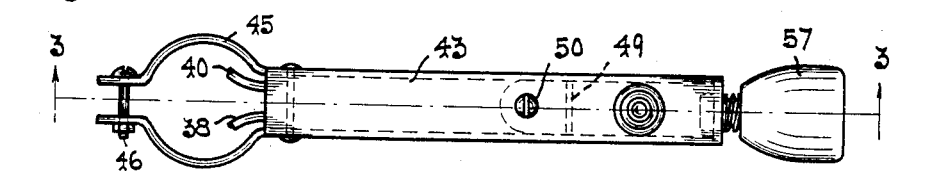
Fig. 2.
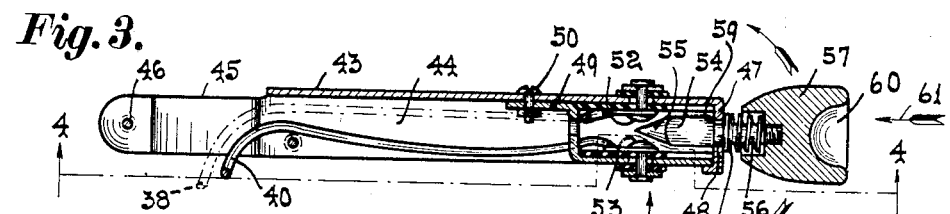
Fig. 3.
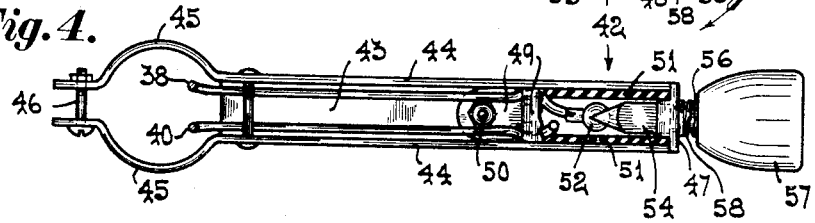
Fig. 4.
Fig. 5.
Inventor
Peter Nielsen
By Arthur H. Sturges
Attorney Patented Mar. 11, 1941

2,234,412

UNITED STATES PATENT OFFICE 2,234,412

SWITCH MECHANISM FOR VEHICLE SIGNALS

Peter Nielsen, Omaha, Nebr., assignor to Jubilee Manufacturing Company, Omaha, Nebr., a corporation of Nebraska Application October 23, 1939, Serial No. 300,710

1 Claim. (Cl. 200—59)

This invention relates to traffic warning signals such as is shown and described in my copending application for patent of the United States Serial No. 212,897, filed June 10, 1938 and has for an object to provide convenient and accessible means for selectively actuating a sounding of two or more signals of different pitch or tone simultaneously for providing a comparatively loud, penetrating warning signal; a single warning note of minute intensity, or single warning notes of different pitch in alternation or sequence as may be desired by a vehicle operator in accordance with traffic and other conditions.

A further object of the invention is to provide means for the above stated purposes which may be readily installed for use upon a motor vehicle or the like by the owner thereof.

Another object of the invention is to provide means for causing a warning signal of comparatively mild tone to be emitted in crowded, slow moving, city traffic and to selectively vary the pitch of said warning for emitting signals of pleasing sound effect, said device also having means for selectively causing the said two tones to be sounded simultaneously in conjunction with the usual horn equipment of an automobile vehicle for creating a loud signal, particularly useful on the highways during rural travel for warning drivers of impeding trucks of the approach of said vehicle from the rear of their trucks.

A still further object of the invention is to provide a switch mechanism for the above stated purposes having means for opening and closing the switch, said means being so positioned with respect to the steering wheel of a vehicle that an operator of the latter may cause said selective warning signals to be generated without removing his hands from the steering wheel of his vehicle during high speeds of the latter and also so positioned that said operator may also actuate the usual signalling horns of his vehicle in conjunction and simultaneously with a plurality of horns of the new device for generating an excessively loud penetrating warning blast which may be heard adjacent a truck above the noise generated by the latter during road traveling movements thereof.

Other and further objects and advantages of the invention will be obvious from the following detailed description thereof.

In the drawing wherein like symbols refer to like or corresponding parts throughout the several views:

Figure 1 is a plan view partly in section of a preferred embodiment of the invention as applied in a position of use to a fragment of a motor vehicle.

Figure 2 is a plan view of a steering mast switch housing support employed.

Figure 3 is a longitudinal section on line 3—3 of Figure 2 and depicting a preferred switch mechanism.

Figure 4 is a view taken on line 4—4 of Figure 3 and showing said switch and housing turned 45 degrees with respect to the showing thereof in Figure 3.

Figure 5 is an end view of a flexibly mounted switch knob employed.

It is well known that in crowded traffic such as at street intersections where pedestrians are crossing a street it often becomes necessary to cause a warning signal to be emitted from a motor vehicle and in instances where the signal is comparatively loud or intense pedestrians become unnecessarily frightened and in instances where a pedestrian is acquainted with the driver of the vehicle a bad feeling is thereby generated between them, and the present invention provides means for causing a courteous warning signal to be emitted to suit the said condition.

It is also well known that while speeding along a highway and in instances where a motorist arrives at the rear of a moving truck, that the noise generated by said truck is often such that the driver thereof cannot hear an ordinary automobile warning signal, whereby the progress of the motorist is delayed and the present invention contemplates obviating the undesirable practices of the prior art.

The present invention also contemplates provision of means for operating horns of different tonal pitch for the herein described purposes and installed upon an automobile after the latter is delivered from a factory to a user in a manner and of an appearance which is satisfactory to said user and is, therefore, so constructed, arranged and combined that a set of prefixed conditions encountered during said installation is accommodated by the present invention without reconstruction of said automobile, said conditions including the facts that modern automobiles are provided with battery current of from five to six volts; conductor wires which are of adequate capacity for said current and for a required 32 ampere capacity are heavy, thick, expensive and of such a clumsy appearance that said users object to such wires when exposed to view adjacent their steering masts; the new control device or master switch of the present invention must be secured to said masts adjacent the steering wheels thereof for efficient results.

Referring now to the drawing for a more particular description 10 indicates generally a motor vehicle or the like having a side wall 11, a windshield glass 12, a cowl-board 13, a dash board 14, a metallic steering mast 15, a steering wheel 16, battery 17 and a frame-ground 18, said parts of such vehicles being conventional. The battery 17 provides electrical energy of low voltage and as is conventional in connection with automobiles, trucks, motor boats and the like said battery is of direct current six volt type.

At the top of the steering mast 15 a horn button 19 is mounted which when depressed is adapted to close an electrical circuit through the battery and a pair of conventional horns, not shown, carried by the vehicle 10 for causing a warning signal to be emitted in a manner which is well known and therefore believed to not require a minute description herein, said horns being those which are installed on the vehicle at the automobile factory.

At 20 a horn of high pitch is generally indicated and the numeral 21 generally indicates a horn of comparatively lower pitch, said horns 20 and 21 being installed on the vehicle by the owner of the latter in addition to the regular horn equipment operable by the button 19.

The horns 20 and 21 each includes a housing 22 within which a conventional coil is provided. The coil is formed of #14 wire approximately of 18 foot length, one end thereof being secured to its metal housing 22 and the other end being secured to a later mentioned conductor wire. The housing 22 further contains a core, vibratable diaphragm and the like adjuncts comprising an electro-magnetic motor for actuating the diaphragm, said parts being well known and conventional are believed to require no particular further description nor illustration herein.

The trumpet portion 23 of the horn 20 is shorter than the trumpet portion 24 for the horn 21, and said horns emit sounds of different pitch. The trumpets are preferably joined together by means of a brace 25 and a metal strap 26. The housings 22 are secured to the strap 26 providing portions of later described energizing circuits. Upon the strap 26 a relay housing 27 is provided for the horn 20 and a similar housing 28 is mounted on said strap for the horn 21, said relays being of conventional type. The relays comprise electro-magnetic switches which are normally open, the coils thereof being formed of approximately 360 turns of #27 wire.

The metal strap 26 is preferably secured to the dash-board 14 of the vehicle or other suitable selected portion of the vehicle 10 and is provided with a circuit wire or cable 29 which extends to the ground-frame 18 and under the hood of the vehicle, said wire 29 having its opposite ends soldered or otherwise suitably secured, respectively, to said strap and ground. If desired the cable 29 may be omitted and the strap 26 attached to or in contact with the frame of the vehicle or metal parts of the latter directly for said ground.

A circuit wire 30 is secured to one end of the coil within the housing 22 of the horn 20 and to the binding post 31 of the relay 27. A wire 32 or the cable conductor of the vehicle extends from the ground-frame 18 to the ground side of the battery 17 and a wire conductor 33 of the present invention extends from the opposite side of said battery to the binding post 34 of the relay 28, said wire 33 also being joined to the binding post 35 of the relay 27. A circuit wire 36 is attached to one end of the coil within the housing 22 of the horn 21 and the other end of the wire 36 is attached to a binding post 37 of the relay 28 for the horn 21, the wires 30, 33 and 36 are of #10 size capacity for a six volt current for energizing the normally open circuits for the horn motors within the housings 22, said motors requiring 14 to 16 amperes for each for providing adequate sound signals and from 28 to 32 amperes at times when both horns are sounded simultaneously as later described herein. A circuit wire 38 extends from the binding post 39 of the relay 27 to a later described manually actuated control switch mechanism and a similar wire 40 extends from the binding post 41 of the relay 28 for the horn 21 to said control switch mechanism 42 mounted on the mast 15.

As thus described it will be noted that if the wires 30 and 36 be extended directly to the switch mechanism 42 that on account of the distance, wires of greater capacity than #10 size are required and #6 size would be necessary in order to carry the current from the horn coils to said mast without voltage drop. Since wires of larger size are objectionable adjacent said mast the relays are provided for controlling the horn coil circuits and the wires 38 and 40 are of the comparatively minute #18 size for the relay circuits.

The arrangement of wires and electrical connections for the horns 20 and 21 and the adjunct parts thereof are preferably such as shown in Figure 1 and it will be noted that if desired three or a larger number of horns, similar to the horns 20 and 21, having tones of different pitch may be employed, two thereof being depicted for convenience of illustration.

The manually actuated switch mechanism is generally indicated at 42 and includes an elongated supporting arm 43 formed of a single piece of sheet metal preferably bent to provide oppositely disposed side walls 44 which, as best shown in Figure 4, extend beyond the main body portion of back of the arm, said extended portions 45 being bent to provide a bifurcated member adapted to encircle the mast 15, as shown in Figure 1, and to be secured and grounded thereto at times when the nut of the keeper bolt 46 is turned up tightly on said bolt for clamping the arm to the mast 15 closely adjacent to the upper end of the mast and for purposes later described.

The main body portion of the arm is bent into abutting parallelism with respect to the straight ends of the side walls 44 which are opposite to the bifurcated end of the arm, said bent end portion 47, as best shown in Figure 3, being provided with an aperture 48 for purposes later described.

As thus described it will be understood that the arm is provided with an end wall consisting of the portion 47 thereof and the side walls 44 and an open side, a cover being provided for said open side for providing a housing for certain later described switch mechanism parts disposed therein, said cover member 49, as best shown in Figure 3, being substantially Z-shaped in cross section. One leg of the cover is secured to the arm 43 by means of a screw 50 and the end of the other leg thereof abuts against the bent end portion 47 of the arm 43 for providing a chamber at one end of the arm within which the switch mechanism is housed and supported.

The circuit wires 38 and 40 are provided with insulating coverings and extend from the electro-magnetic relay switch housings 27 and 28, respectively, through the dash board 15 of the vehicle to the arm 43 being adjacent to and preferably abutted against the metallic mast 15, having ends which terminate within the housing at the free end of said arm. The inner walls of the switch mechanism housing are provided with suitable insulation 51. The end of the wire 38 is provided with a contact or terminal 52 and the end of the wire 40 is provided with a similar terminal or contact 53 which is oppositely disposed with respect to the contact 52 as best shown in Figure 3, said insulation preventing the said contacts from touching the housing.

The manual switch mechanism further includes an electrode 54 mounted in said housing, said electrode having an end 55 of conical shape in plan. The electrode 54 is provided with a metallic shaft 56 which extends through the aperture 45 of the bent end portion 47 of the arm and a knob 57 formed of ornamental insulating material is threadedly secured to the shaft 56 as shown in Figure 3.

An expansible spring 58 encircles the shaft 56, being disposed between the knob 57 and the said bent end portion 47 of the arm for normally urging the knob 57 away from the arm for causing the electrode 54 to normally remain out of abutting relation with either of the contacts 52 and 53 and in contact at all times with the end portion 47 of the arm 43 and in communication with the metallic mast 15 and ground 18. A movement of the electrode in one direction is limited by the shoulder 59 thereof striking the end wall of the housing or the portion 47 thereof.

The shaft 56 of the electrode 54 is loosely mounted through said aperture 48 whereby the electrode 54 may be tilted in different directions within the housing for causing the end 55 of the electrode to selectively engage against either of the contacts 52 or 53 or both thereof as may be desired, said shaft during operation being in contact with the metal housing and the latter being secured to and in contact with the metal steering mast 15 for providing a circuit at times when a circuit or circuits are closed through said mast as later described.

The knob 57 is provided with a recess 60 let into the outer end thereof for the reception of one of the longer fingers of an operator's hand.

It will be understood that the length of the arm 43 is such that in conjunction with the length of the knob 57, that at times when the switch is mounted on the steering mast, as shown in Figure 1, the outer end of the knob 57 is disposed closely adjacent to the perimeter of the steering wheel 16 whereby the operator may, while retaining his grasp of the steering wheel, as shown by the dotted lines in Figure 1, utilize one of his fingers, by placing the end of said finger within the recess 60, for depressing the knob 57 in the direction of the arrow 61 for causing circuits to be simultaneously closed for sounding both horns 20 and 21 simultaneously for generating a loud or comparatively intense penetrating warning signal. At times when desired the operator may cause the electrode 54 to move into abutting relationship with the contact 52 and to the exclusion of the contact 53 for causing a warning note of high pitch to be emitted from the horn 20 and similarly may cause a sound of lower pitch to be emitted from the horn 21 and to the exclusion of the horn 20 and by reciprocating the knob 57 with his finger for causing a corresponding movement of the end 55 of the electrode 54 he may cause the electrode's end 55 to alternately engage the contacts 52 and 53 for effecting a change-of-note warning of pleasing sound.

As thus described it will be noted that the operator may cause two notes of low pitch and of short duration to be rapidly sounded followed by a note of higher pitch and of longer duration or a reversal of said order of sounding or a combination of said sounds for expeditiously causing to be emitted telegraphic sound signals privately understood between an operator and his family at advantageous times such as while his vehicle approaches his home for notifying or inviting a member of said family or his servant to open a garage door or the like. The arrangement of said knob and the position thereof adjacent the steering wheel being such that it facilitates a rapid reciprocation thereof similar to the operation of the key of a telegraphic instrument and by the operator's hand while he is seated adjacent said wheel for steering and driving said vehicle.

It will be understood that at times when more than two of the horns are employed that a third contact like the contacts 52 and 53 may be provided upon one of the side walls 44 of the arm 43, whereby the notes of a chord can be sounded simultaneously or in sequence or in alternation as may be desired.

For excessively loud warning blasts the knob 57 is moved in the direction of the arrow 61 while at the same time the operator may depress the button 19 at the top of the mast 15 for utilizing the usual audible signalling equipment carried by the vehicle.

As thus described it will be noted that two horns of different tones, when sounded, are employed; two horn motors; a separate normally open circuit for each motor; a normally open electro-magnetic switch or relay for each horn circuit for a closure of said horn motor circuits separately or simultaneously as desired; a separate independent circuit for each relay device for closing the switch thereof and but one manually actuatable normally open switch device for closing either relay circuit selected or both relay circuits in unison.

It is obvious that various changes and modifications may be made in the details of construction and design of the above specifically described embodiment of this invention without departing from the spirit thereof.

I claim:

A switch mechanism for the electrical circuits of automobile horns comprising a body portion bent to provide oppositely disposed side walls extending beyond the body portion to provide clamping arms, said body portion also bent to form an end wall in abutting parallelism with said side walls, a cover within said support, said cover comprising a plate secured to the body portion and bent parallel with said body to abut against the end wall thereof, said support adapted to be secured to the metallic steering mast of said automobile adjacent the perimeter of the steering wheel of said mast, oppositely disposed terminals for one of the ends of each of the said circuits associated with said support within said cover, said terminals being insulated with respect to each other and said support, a metallic lever disposed in contact with said support having an end adapted to be selectively moved into contact with either or both of said terminals, resilient means for normally maintaining the said end of the lever out of contact with said terminals, and a knob carried by said lever, said knob having a recess for the reception of an operator's finger tip for moving said lever against the urge of said spring.

PETER NIELSEN.